July 29, 1930.　　　J. HAUENSTEIN　　　1,771,754
ADJUSTABLE FLASH LIGHT SUPPORT
Filed May 20, 1929
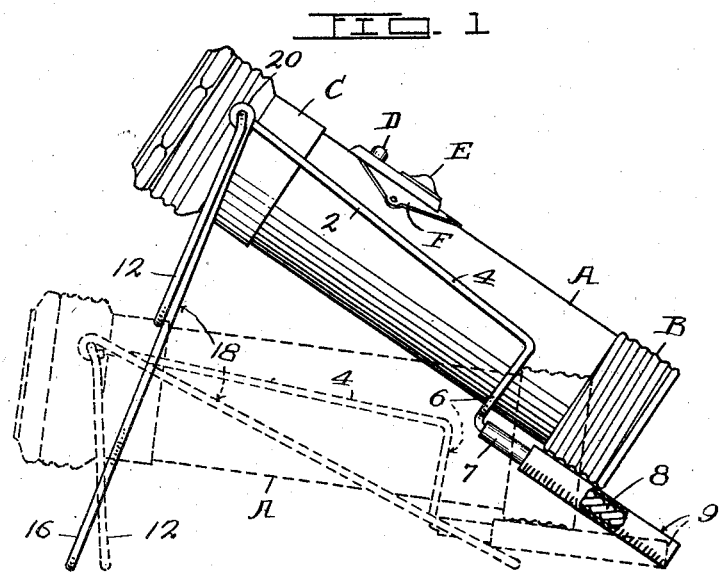
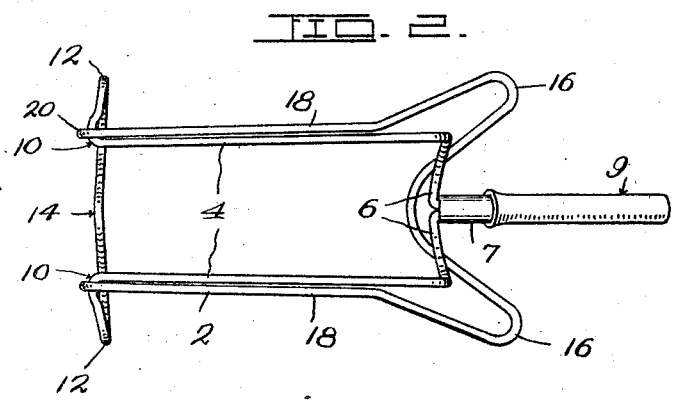
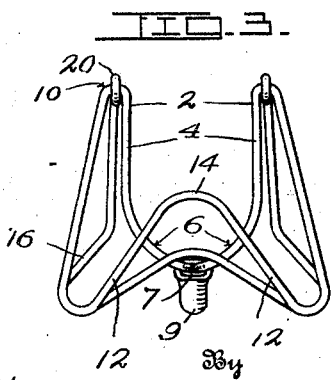
Inventor
John Hauenstein,
By F. G. Fischer,
Attorney.
Witness:
Fred C. Fischer.

Patented July 29, 1930

1,771,754

UNITED STATES PATENT OFFICE

JOHN HAUENSTEIN, OF KANSAS CITY, MISSOURI

ADJUSTABLE FLASH-LIGHT SUPPORT

Application filed May 20, 1929. Serial No. 364,557.

My invention relates to flash light supports of the type disclosed by the U. S. Patent No. 1,527,479 granted to me on the 24th day of February, 1925.

One of the main objects of the present invention is to provide a device of this character which is of neater design and can be produced more cheaply in large quantities than the one shown in my patent above referred to.

In the accompanying drawing which illustrates the invention:

Fig. 1 is a side view of the holder with a flash light in position thereon, said holder being adjusted to direct the light upwardly at a high angle as shown in full lines, and at a lesser angle as disclosed by dotted lines.

Fig. 2 is a plan view of the holder with the flash light removed and a foldable leg, forming a part of the device, in folded position.

Fig. 3 is a front elevation of the holder with the foldable leg in folded position.

In carrying out the invention I provide a resilient skeleton frame 2 consisting a pair of approximately parallel side elements 4, the rear portions of which are curved downwardly and towards each other as indicated at 6 to conform to the curvature of the flash light, and then extend rearwardly to form a leg 8. The portions forming the leg 8 are twisted together as shown by Fig. 1 and are further secured together by means of a clip 7. The leg 8 is covered with a piece of rubber tubing or other insulating material 9 for preventing short circuiting of the flash light A as will hereinafter appear.

The forward ends of the elements 4 are bent laterally as indicated at 10 and then downwardly to form a pair of front legs 12 which are spread apart as shown by Fig. 3 to lend stability to the device so that it will not readily upset. The adjacent portions of the legs 12 are united by an arch 14 which coacts with the rear leg 8 in supporting the flash light A.

16 designates a pair of foldable legs which are spread apart at their lower portions to coact with the rear leg 8 and the front legs 12 in forming a stable support for the flash light A. The legs 16 have upward extensions 18 which are approximately parallel with each other and formed at their upper ends into loops 20 which operably engage the lateral portions 10 of the elements 4.

Preferably, all parts of the device excepting the clip 7 and the tube 9 are of suitable spring tempered wire and the side elements 4 are normally close enough together to grip the flash light A and hold it in place when it is pushed downwardly to its seats upon the rear leg 8 and the arch 14. When the flash light is seated as stated its rear metal cap B rests upon the rubber tube 9 which acts as an insulator in preventing current passing from the battery through said cap B, the elements 4 and the metallic forward portion C of the flash light and causing the bulb to glow and use up the energy of the battery before the light is required.

In practice, when it is desired to use the flash light while changing a tire or performing other work where it is not necessary to adjust the light upwardly to a high angle, the device is supported upon the rear leg 8 and the front legs 12, while the legs 16 are folded backwardly to the dotted line position disclosed by Fig. 1, but when it is desired to throw the light at a higher angle the legs 16 are swung forwardly against the legs 12, as shown by full lines, Fig. 1, to give the flash light a greater pitch. The light may be turned on by operating the switches D or E in the usual manner, or the flash light may be turned axially to carry the metal part F into contact with one of the side elements 4 so that current may travel therethrough to the part C.

From the foregoing description taken in connection with the drawing, it is apparent that I have provided a flash light holder embodying the advantages above pointed out, and while I have shown and described one form of the invention I reserve all rights to such other forms and modifications as properly fall within the spirit and scope of the invention as claimed.

Having thus described my invention, what I claim and desire to secure by Letters Patent, is:

A flash light holder consisting of a pair of approximately parallel side elements connected together at their rear ends and adapted to grip the flash light, legs extending downwardly from the forward ends of said side elements for supporting the latter in an inclined position, and legs foldably connected to the side elements for supporting the flash light at a greater angle than the first-mentioned legs.

In testimony whereof I affix my signature.

JOHN HAUENSTEIN.